United States Patent
Chang et al.

(10) Patent No.: US 9,779,555 B2
(45) Date of Patent: Oct. 3, 2017

(54) VIRTUAL REALITY SYSTEM

(71) Applicant: HTC Corporation, Taoyuan (TW)

(72) Inventors: Wei-Chih Chang, Taoyuan (TW); Mong-Yu Tseng, Taoyuan (TW)

(73) Assignee: HTC Corporation, Taoyuan (TW)

( * ) Notice: Subject to any disclaimer, the term of this patent is extended or adjusted under 35 U.S.C. 154(b) by 15 days.

(21) Appl. No.: 14/951,037

(22) Filed: Nov. 24, 2015

(65) Prior Publication Data
US 2016/0163283 A1 Jun. 9, 2016

Related U.S. Application Data

(60) Provisional application No. 62/087,593, filed on Dec. 4, 2014.

(51) Int. Cl.
| | |
|---|---|
| *G06T 19/00* | (2011.01) |
| *G06T 7/73* | (2017.01) |
| *G06T 7/60* | (2017.01) |
| *G06T 7/20* | (2017.01) |
| *G06K 9/52* | (2006.01) |
| *G02B 27/01* | (2006.01) |
| *G09G 5/00* | (2006.01) |

(Continued)

(52) U.S. Cl.
CPC .......... *G06T 19/006* (2013.01); *G02B 27/017* (2013.01); *G02B 27/0172* (2013.01); *G02B 27/0179* (2013.01); *G06F 3/011* (2013.01); *G06F 3/013* (2013.01); *G06F 3/0346* (2013.01); *G06K 9/52* (2013.01); *G06T 7/20* (2013.01); *G06T 7/60* (2013.01); *G06T 7/73* (2017.01); *G09G 5/006* (2013.01); *G02B 2027/014* (2013.01); *G02B 2027/0134* (2013.01); *G02B 2027/0138* (2013.01); *G02B 2027/0187* (2013.01); *G09G 2370/16* (2013.01)

(58) Field of Classification Search
CPC . G06T 19/006; G09G 2370/16; G02B 27/017
See application file for complete search history.

(56) References Cited

U.S. PATENT DOCUMENTS

2006/0132492 A1* 6/2006 Cantin ................ G09G 5/363
  345/519
2010/0110368 A1 5/2010 Chaum
(Continued)

FOREIGN PATENT DOCUMENTS

WO WO-2014/033306 A1 * 3/2014

*Primary Examiner* — Jeffery A Brier
(74) *Attorney, Agent, or Firm* — Birch, Stewart, Kolasch & Birch, LLP

(57) ABSTRACT

A virtual reality system is provided. The virtual reality system includes a host device and a head mounted display apparatus to be worn by a user. The head mounted display apparatus includes a first wireless module, a second wireless module, a multimedia module, a multi-sensing module, and a peripheral hub. The multimedia module receives multimedia content from the host device through the first wireless module. The multi-sensing module obtains sensing information regarding the head mounted display apparatus and the user. The peripheral hub receives communication data from the host device through the second wireless module, and provides the sensing information to the host device through the second wireless module.

24 Claims, 8 Drawing Sheets

(51) Int. Cl.
*G06F 3/0346* (2013.01)
*G06F 3/01* (2006.01)

(56) References Cited

U.S. PATENT DOCUMENTS

| | | | |
|---|---|---|---|
| 2010/0141613 A1* | 6/2010 | Sonobe | G09G 5/18 345/204 |
| 2011/0187640 A1 | 8/2011 | Jacobsen et al. | |
| 2012/0068914 A1 | 3/2012 | Jacobsen et al. | |
| 2012/0206452 A1* | 8/2012 | Geisner | G02B 27/017 345/419 |
| 2013/0286004 A1* | 10/2013 | McCulloch | G06T 19/006 345/419 |
| 2013/0293468 A1 | 11/2013 | Perez et al. | |
| 2013/0321390 A1 | 12/2013 | Latta et al. | |
| 2014/0002496 A1 | 1/2014 | Lamb et al. | |
| 2014/0099934 A1* | 4/2014 | Chen | H04W 52/0261 455/418 |
| 2015/0326774 A1* | 11/2015 | Chinery, III | H04N 7/181 348/207.1 |

* cited by examiner

VIRTUAL REALITY SYSTEM

CROSS REFERENCE TO RELATED APPLICATIONS

This application claims the benefit of U.S. Provisional Application No. 62/087,593, filed Dec. 4, 2014, the entirety of which is incorporated by reference herein.

BACKGROUND OF THE INVENTION

Field of the Invention

The invention relates to a virtual reality system, and more particularly to a head mounted display apparatus for a virtual reality system.

Description of the Related Art

Displays with virtual image generation are often used in display devices which are located close to the eyes, so-called near-to-eye displays. Such display devices are known, for example, as head mounted displays (HMD).

An HMD is a display device that a person wears on the head in order to have video information directly displayed in front of the eyes. HMDs are also known as near-to-eye displays. An HMD has either one or two small LCD or OLED displays with magnifying lenses and other optical elements. The displays and optics are typically embedded in a helmet, glasses, or a visor, which a user can wear. Lenses and other optical components are used to give the user the perception that the images are coming from a greater distance, to prevent eyestrain. In HMDs that use a single display, the image is typically projected through optics that split the image into two identical images, and redirects each image to the respective eye. With two displays, the HMD can show stereoscopic images. The stereoscopic images attempt to create depth in the images by simulating the angular difference between the images viewed by each eye when looking at an object, due to the different positions of the eyes. This angular difference is one of the key parameters the human brain uses in processing images to create depth perception or distance in human vision.

BRIEF SUMMARY OF THE INVENTION

Virtual reality systems are provided. An embodiment of a virtual reality system is provided. The virtual reality system comprises a host device, and a head mounted display apparatus to be worn by a user. The head mounted display apparatus comprises a first wireless module, a second wireless module, a multimedia module, a multi-sensing module, and a peripheral hub. The multimedia module receives multimedia content from the host device through the first wireless module. The multi-sensing module obtains sensing information regarding the head mounted display apparatus and the user. The peripheral hub receives communication data from the host device through the second wireless module, and provides the sensing information to the host device through the second wireless module.

Furthermore, another embodiment of a virtual reality system is provided. The virtual reality system comprises a host device, a transmission cable, a head mounted display apparatus to be worn by a user, and a connection control unit coupled to the head mounted display apparatus through the transmission cable. The head mounted display apparatus comprises a first wireless module, a multimedia module, a multi-sensing module, and a peripheral hub. The multimedia module receives multimedia content from the host device through the first wireless module. The multi-sensing module obtains sensing information regarding the head mounted display apparatus and the user. The peripheral hub obtains communication data from the transmission cable, and provides the sensing information to the transmission cable. The connection control unit comprises a second wireless module, and a battery. The connection control unit receives the communication data from the host device through the second wireless module, and provides the communication data to the head mounted display apparatus through the transmission cable. The connection control unit receives the sensing information from the head mounted display apparatus through the transmission cable, and provides the sensing information to the host device through the second wireless module.

Moreover, another embodiment of a virtual reality system is provided. The virtual reality system comprises a host device, a transmission cable, a head mounted display apparatus to be worn by a user, and a connection control unit coupled to the head mounted display apparatus through the transmission cable. The head mounted display apparatus comprises a multimedia module obtaining multimedia content from the transmission cable, a multi-sensing module obtaining sensing information regarding the head mounted display apparatus and the user, and a peripheral hub obtaining communication data from the transmission cable, and providing the sensing information to the transmission cable. The connection control unit comprises a first wireless module, a second wireless module and a battery. The connection control unit receives the multimedia content from the host device through the first wireless module, and provides the multimedia content to the head mounted display apparatus through the transmission cable. The connection control unit receives the communication data from the host device through the second wireless module, and provides the communication data to the head mounted display apparatus through the transmission cable. The connection control unit receives the sensing information from the head mounted display apparatus through the transmission cable, and provides the sensing information to the host device through the second wireless module.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
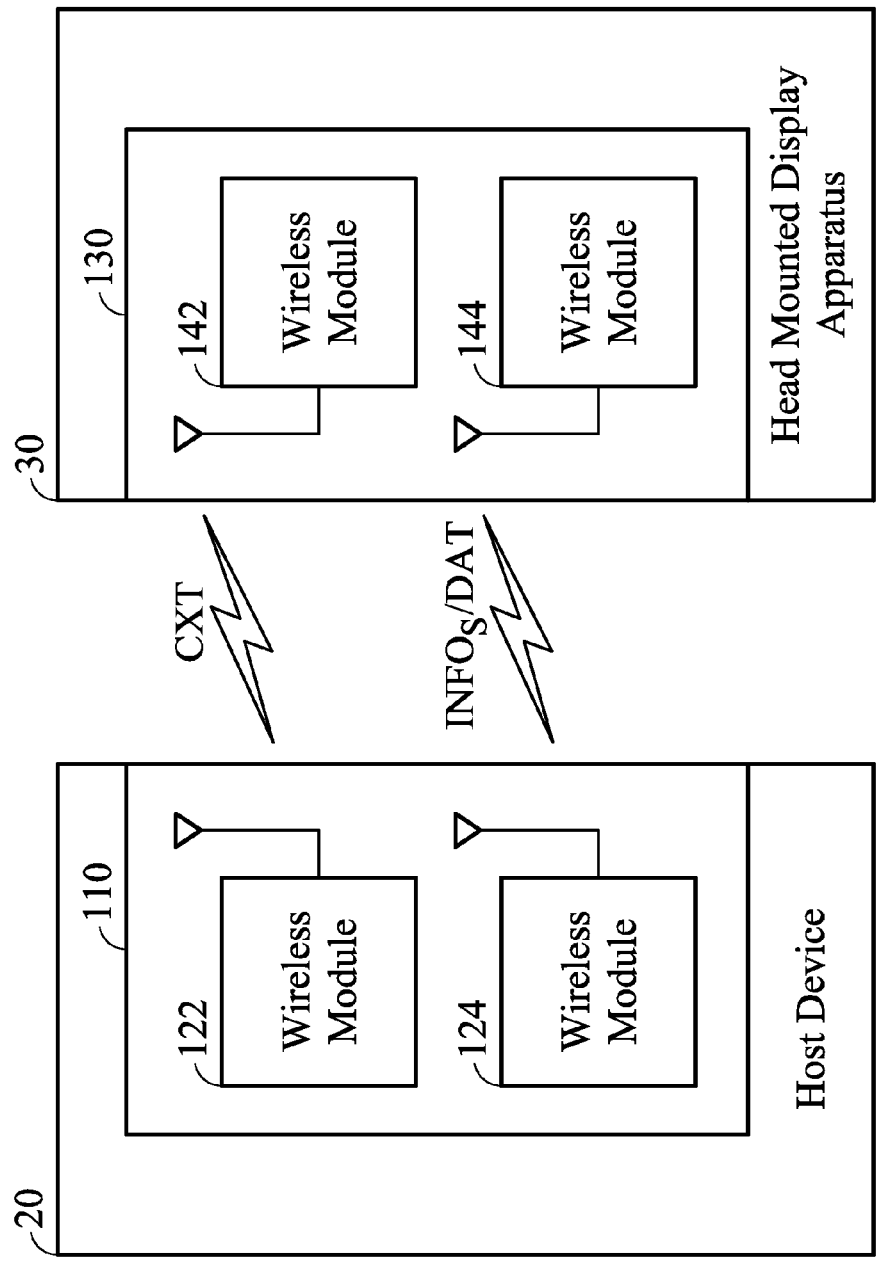
FIG. 1 shows a virtual reality system according to an embodiment of the invention.

FIG. 1 shows a virtual reality system 10 according to an embodiment of the invention. The virtual reality system 10 comprises a host device 20 and a head mounted display apparatus 30 to be worn by a user. A communication unit 110 of the host device 20 comprises a wireless module 122 for providing a multimedia content CXT to the head mounted display apparatus 30, and a wireless module 124 for providing the communication data DAT to the head mounted display apparatus 30. The head mounted display apparatus 30 is capable of playing the multimedia content CXT from the host device 20, and obtaining the sensing information $INFO_S$ regarding the head mounted display apparatus 30 and/or the user wearing the head mounted display apparatus 30. A communication unit 130 of the head mounted display apparatus 30 comprises a wireless module 142 for receiving the multimedia content CXT from the host device 20, and a wireless module 144 for receiving the communication data DAT from the host device 20 and providing the sensing information $INFO_S$ to the host device 20. Based on the information sensed by the head mounted display apparatus 30, the host device 20 can timely modulate the multimedia content CXT. In one embodiment, the host device 20 is capable of processing a multimedia source and generating the multimedia content CXT according to the multimedia source and the information sensed by the head mounted display apparatus 30. It should be noted that the wireless module 122 of the host device 20 and the wireless module 142 of the head mounted display apparatus 30 support the same wireless technology (e.g. Bluetooth, WiFi, etc.), and the wireless module 124 of the host device 20 and the wireless module 144 of the head mounted display apparatus 30 support the same wireless technology (e.g. Bluetooth, WiFi, etc.).

Figure 2:
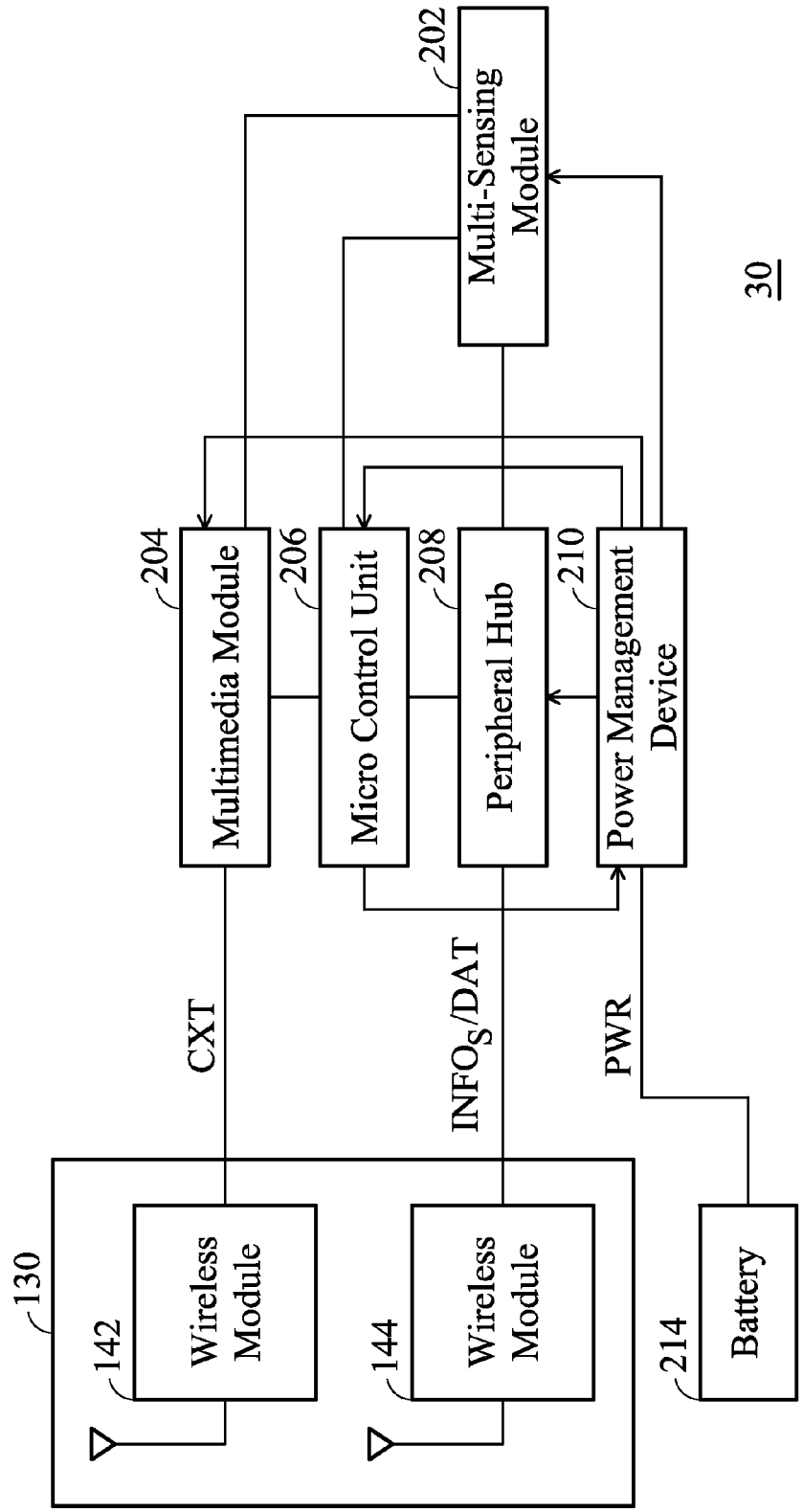
FIG. 2 shows an example of the head mounted display apparatus of FIG. 1 according to an embodiment of the invention.

FIG. 2 shows an example of the head mounted display apparatus 30 of FIG. 1 according to an embodiment of the invention. In the embodiment, the head mounted display apparatus 30 further comprises a multi-sensing module 202, a multimedia module 204, a micro control unit 206, a peripheral hub 208, a power management device 210, and a battery 214. The multi-sensing module 202 can sense the position of the user, the biometrical information of the user, and/or the environment surrounding the head mounted display apparatus 30 to generate the sensing information $INFO_S$ when the user is wearing the head mounted display apparatus 30. In an exemplary embodiment, the sensing information $INFO_S$ may comprise position information $INFO_P$, user information $INFO_U$, and/or environment information $INFO_E$. The position information $INFO_P$ can comprise movement information, orientation information, tilt angle information, and/or location information regarding the head mounted display apparatus 30. The user information $INFO_U$ can comprise biometrical information about the user and/or eye view information sensed by the multi-sensing module 202. Furthermore, the environment information $INFO_E$ can comprise images/video and/or depth information captured by the multi-sensing module 202.

In FIG. 2, through the wireless module 142 of the communication unit 130, the multimedia module 204 can receive the multimedia content CXT from the wireless module 122 of the host device 20 of FIG. 1. The multimedia module 204 can process and play the multimedia content CXT, e.g. audio, image, or video content. The multimedia module 204 can be coupled to the multi-sensing module 202, so as to obtain the sensing information $INFO_S$. Thus, display parameters (such as brightness and refresh time) can be modulated by the multimedia module 204 according to the sensing information $INFO_S$. Furthermore, the micro control unit (MCU) 206 is electrically coupled to the multi-sensing module 202 and the multimedia module 204. The micro control unit 206 can issue control information to coordinate functions of the multi-sensing module 202 and the multimedia module 204 according to the communication data DAT from the host device 20. The micro control unit 206 can receive the sensing information $INFO_S$ from the multi-sensing module 202, and transmit the sensing information $INFO_S$ to the host device 20 through the peripheral hub 208 and the wireless module 144 of the communication unit 130.

Referring to FIG. 1 and FIG. 2 together, the peripheral hub 208 can receive the communication data DAT from the wireless module 124 of the host device 20 through the wireless module 144 of the communication unit 130. The peripheral hub 208 is coupled to the multi-sensing module 202, so as to receive the sensing information $INFO_S$. Furthermore, the peripheral hub 208 is also coupled to the micro control unit 206, so as to receive the control information. The peripheral hub 208 may be coupled to a plurality of peripheral devices of the head mounted display apparatus 30, such as microphones, speakers, or an extended hub. The peripheral hub 208 can provide the sensing information $INFO_S$ to the wireless module 124 of the host device 20 through the wireless module 144 of the communication unit 130. Furthermore, the power management device 210 can receive a power voltage PWR from the battery 214. In the embodiment, the power management device 210 is connected to each component of the head mounted display apparatus 30 for powering the components, including the multi-sensing module 202, the multimedia module 204, the micro control unit 206, the peripheral hub 208, and the wireless modules 142 and 144. The power management device 210 comprises a plurality of power circuits, wherein each power circuit is capable of modulating a supply of power according to the power voltage PWR of the battery 214, and providing the power supply to power the corresponding component according to the control information from the micro control unit 206. Specifically, the power management device 210 can perform power management control and peripheral control according to the control information from the micro control unit 206.

Figure 3:
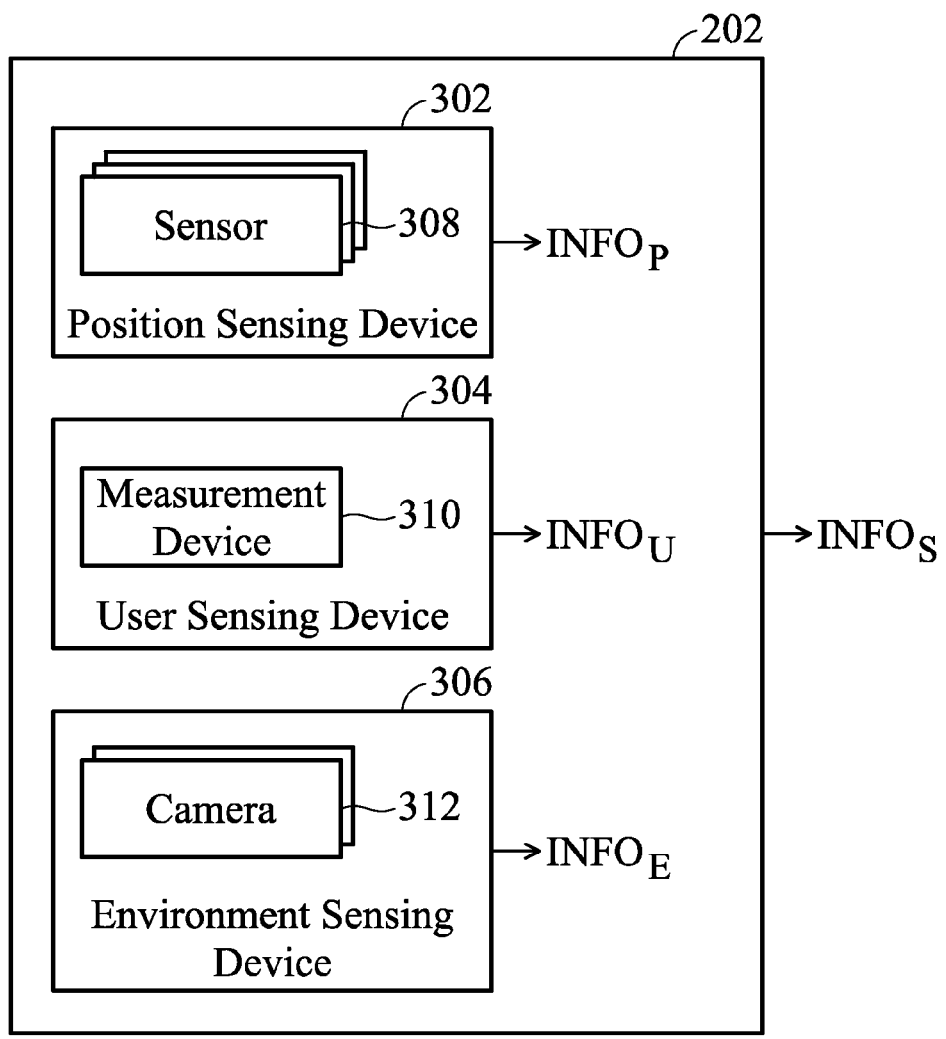
FIG. 3 shows an example of the multi-sensing module of FIG. 2 according to an embodiment of the invention.

FIG. 3 shows an example of the multi-sensing module 202 of FIG. 2 according to an embodiment of the invention. The multi-sensing module 202 comprises a position sensing device 302 for obtaining the position information $INFO_P$ corresponding to the head mounted display apparatus 30, a user sensing device 304 for obtaining the user information $INFO_U$, and/or an environment sensing device 306 for obtaining the environment information $INFO_E$, wherein the multi-sensing module 202 provides the sensing information $INFO_S$ according to the position information $INFO_P$, the user information $INFO_U$, and the environment information $INFO_E$. The position sensing device 302 comprises a plurality of sensors 308 for sensing the position information INFO$_P$ of the head mounted display apparatus 30. A position reference device can be located at a distance away from the head mounted display apparatus 30, so as to wirelessly provide reference information to the position sensing device 302. Thus, the position sensing device 302 can use the reference information to generate the position information INFO$_P$. Furthermore, the user sensing device 304 comprises at least one measurement device 310 for sensing the user information INFO$_U$, such as an Inter-pupillary distance (IPD) measurement device for measuring eye view information of the user, e.g. the visual angle of the user. The environment sensing device 306 comprises a camera or at least two cameras 312 for capturing images/video of objects which the head mounted display apparatus 30 is facing, and obtaining the depth information of the objects relative to the head mounted display apparatus 30. A depth map can be calculated by the head mounted display apparatus 30 or the host device 20 according to the depth information. Furthermore, the camera lens of the cameras 312 can be moved by the micro control unit 206, so as to obtain more depth information for the depth map. The cameras 312 are spatially separated apart from each other. The cameras 312 can capture images and generate parallax information about the captured images, wherein the field of view (FOV) of each of the cameras at least partially overlap so that the parallax information can be generated. The parallax information can be provided to the host device 20 as depth information, which can be calculated by the host device 20, so as to generate a depth map or a depth model of the space or object faced by the head mounted display apparatus 30. In one embodiment, the cameras 312 are allocated in parallel and with a tilt angle between the viewing direction at which the head mounted display apparatus 30 can be viewed by the user. With the tilt angle, the cameras 312 can sense the lower region which the head mounted display apparatus 30 is facing. Moreover, the host device 20 is capable of monitoring a clear zone in which the head mounted display apparatus 30 is facing according to the depth information. Thus, the virtual reality system 10 is capable of alerting the user when the clear zone falls into a short distance range. For example, the head mounted display apparatus 30 and the host device 20 can alert the user to obstructions in a room.

Figure 4:
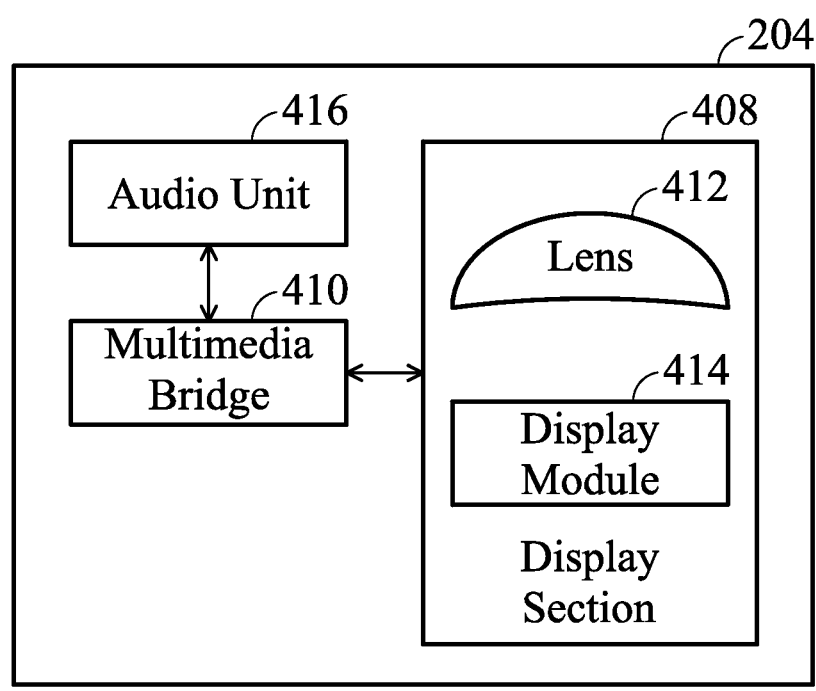
FIG. 4 shows an example of the multimedia module of FIG. 2 according to an embodiment of the invention.

FIG. 4 shows an example of the multimedia module 204 of FIG. 2 according to an embodiment of the invention. The multimedia module 204 can process and play the multimedia content CXT, e.g. audio, image, or video content. The multimedia module 204 comprises at least one display section 408, a multimedia bridge 410, and an audio unit 416. Each display section 408 can comprise a lens 412, and a display module 414. The audio unit 416 is capable of delivering audio sounds of the multimedia content CXT (i.e. the audio part of the multimedia content CXT) or recording sounds from the user or environment. The audio unit 416 is coupled to the multimedia bridge 410 for an audio playback function. Furthermore, referring to FIG. 4 and the FIG. 2 together, the audio unit 416 is coupled to the peripheral hub 208 for a microphone function when a microphone is coupled to the peripheral hub 208. The audio unit 416 may comprise an audio codec for coding/decoding audio signals of the multimedia content CXT, and for coding/decoding the signals of the microphone and/or a speaker/earphone coupled to the peripheral hub 208. The multimedia bridge 410 is coupled between the wireless module 142 and the display section 408 for transforming the multimedia content CXT (e.g. the video part of the multimedia content) into display signals that are readable by the display section 408.

Figure 5:
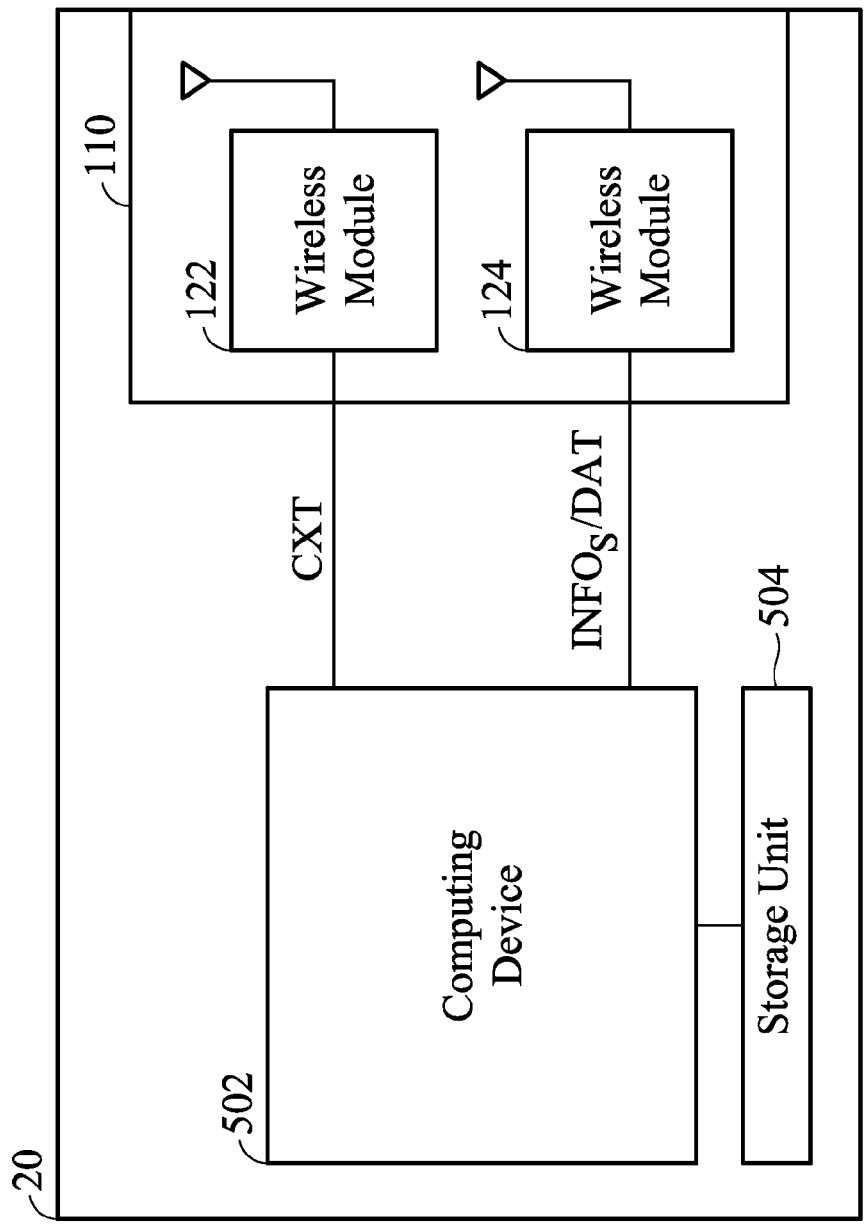
FIG. 5 shows an example of the host device of FIG. 1 according to an embodiment of the invention.

FIG. 5 shows an example of the host device 20 of FIG. 1 according to an embodiment of the invention. The host device 20 further comprises a computing device 502 for generating the multimedia content CXT. The host device 20 may be a personal computer, a notebook, a tablet PC, a smartphone, or any other portable device with a powerful processor inside. The computing device 502 can receive a multimedia source from a storage unit 504 or Internet network, and the computing device 502 is capable of generating the multimedia content CXT according to the multimedia source and the sensing information INFO$_S$ from the head mounted display apparatus 30. The computing device 502 is also capable of generating the communication data DAT according to the sensing information INFO$_S$.

Figure 6:
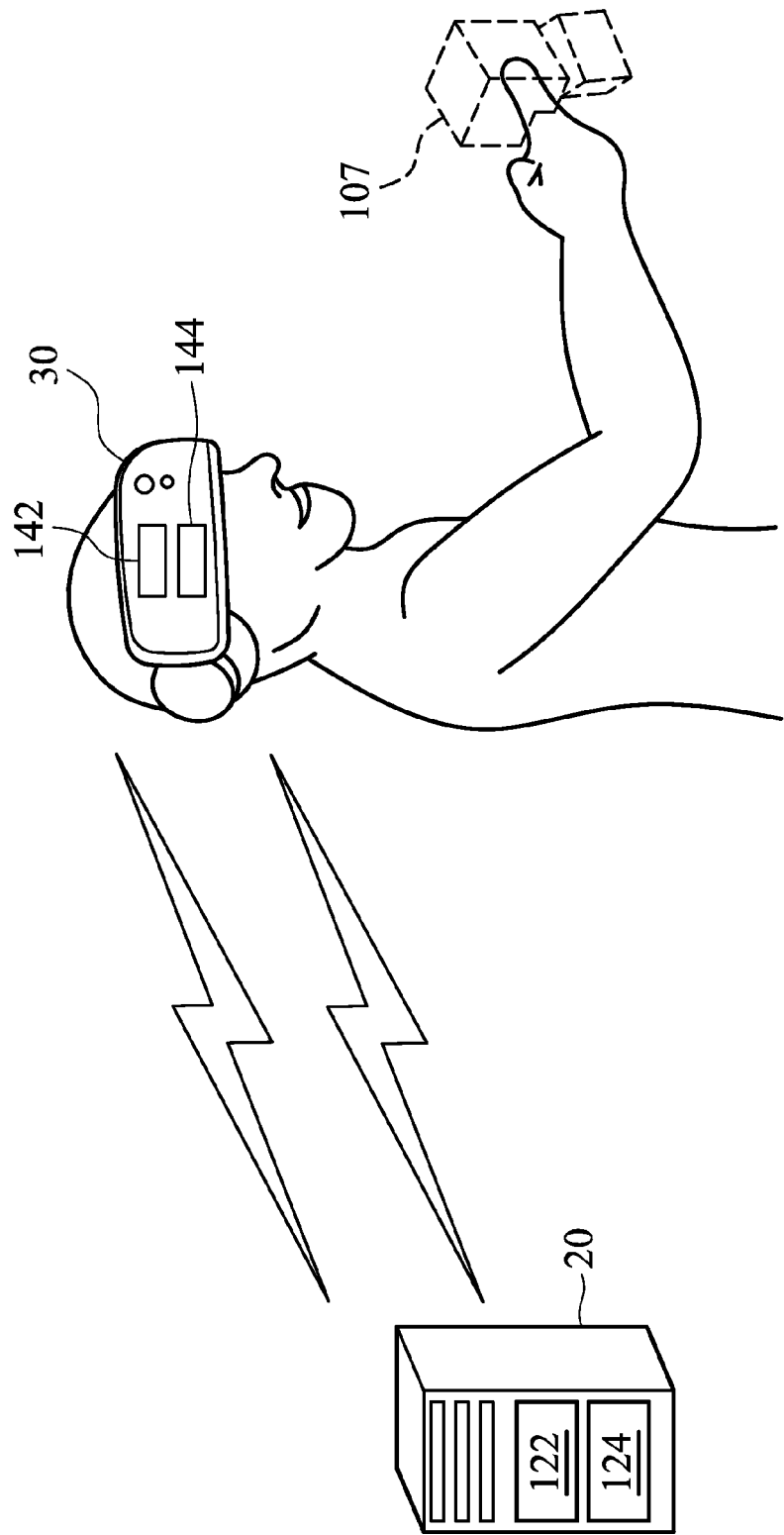
FIG. 6 shows an exemplary architecture of the virtual reality system of FIG. 1 according to an embodiment of the invention.

FIG. 6 shows an exemplary architecture of the virtual reality system 10 of FIG. 1 according to an embodiment of the invention. The host device 20 is capable of wirelessly transmitting the multimedia content CXT to the head mounted display apparatus 30 by the wireless module 122, wirelessly transmitting the communication data DAT to the head mounted display apparatus 30 by the wireless module 124, and wirelessly receiving the sensing information INFO$_S$ from the head mounted display apparatus 30 by the wireless module 124. In one embodiment, each of the wireless modules 142 and 144 of the head mounted display apparatus 30 comprises at least two antennas, each facing in a different direction, for wirelessly receiving information from the host device. The wireless modules 142 and 144 can be circular and can be mounted on a belt or other wearable apparatus. In addition, the wireless modules 142 and 144 can be on board or a modular type near a main PCB (printed circuit board). For example, the head mounted display apparatus 30 may comprise a helmet, wherein the circular wireless module 142 or 144 is encircled around the helmet. Since the head mounted display apparatus 30 is to be worn on the head of a user during operation, the user's body, hands or furniture in front of the user will not obstruct the transmission of the wireless signals from the host device 20. In the embodiment, label 107 represents the virtual objects that are viewed by the user wearing the head mounted display apparatus 30.

Figure 7A:
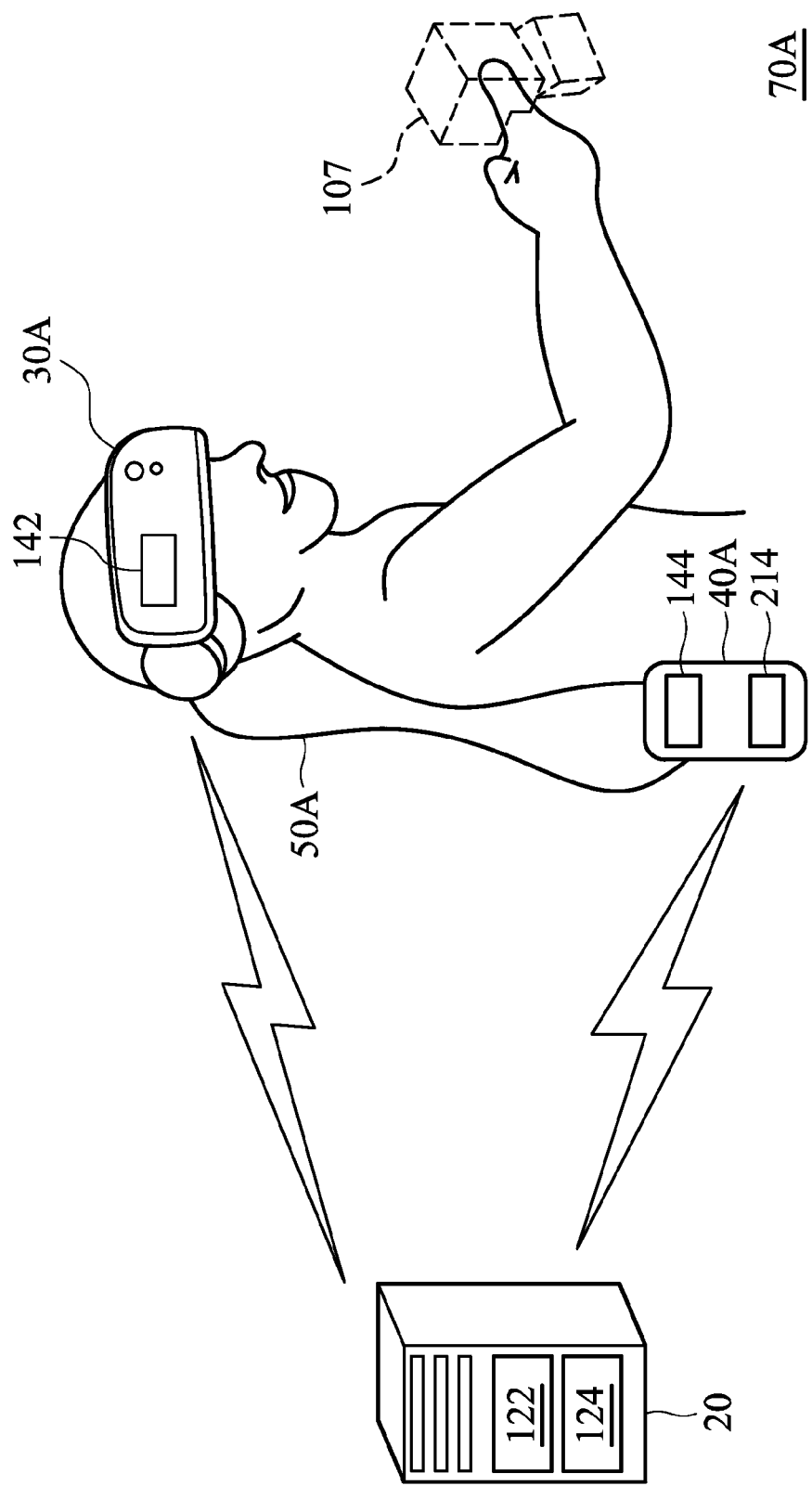
FIG. 7A shows an exemplary architecture of a virtual reality system according to another embodiment of the invention.

FIG. 7A shows an exemplary architecture of a virtual reality system 70A according to another embodiment of the invention. In FIG. 7A, the virtual reality system 70A comprises a host device 20, a head mounted display apparatus 30A, a connection control unit 40A, and a transmission cable 50A. The connection control unit 40A is connected to the head mounted display apparatus 30A through the transmission cable 50A. The transmission cable 50A can transmit the communication data DAT and the sensing information INFO$_S$ between the head mounted display apparatus 30A and the connection control unit 40A. In the embodiment, the connection control unit 40A at least comprises a wireless module 144 for receiving the communication data DAT from the host device 20 and providing the sensing information INFO$_S$ to the host device 20, a battery 214, and a controller (not shown) capable of controlling the operations of the wireless module 144 and the battery 214. Furthermore, the controller of the connection control unit 40A can control the transmission cable 50A to transmit a power voltage PWR of the battery 214 to the head mounted display apparatus 30A. For example, the transmission cable 50A comprises a communication path for transmitting the communication data DAT and/or the sensing information INFO$_S$, and a power path for transmitting the power voltage PWR. Compared with the head mounted display apparatus 30 of FIG. 2 and FIG. 6, a communication unit of the head mounted display apparatus 30A only comprises a single wireless module 142 for receiving the multimedia content CXT from the host device 20. Therefore, the head mounted display apparatus 30A can obtain the communication data DAT from the host device 20 through the wireless module 144 of the connection control unit 40A and the transmission cable 50A, and provides the sensing information $INFO_S$ to the host device 20 through the transmission cable 50A and the wireless module 144 of the connection control unit 40A. In the embodiment, the battery 214 is implemented in the connection control unit 40A, thereby decreasing the weight of the head mounted display apparatus 30A. Thus, the user wearing the head mounted display apparatus 30A will feel more comfortable.

Figure 7B:
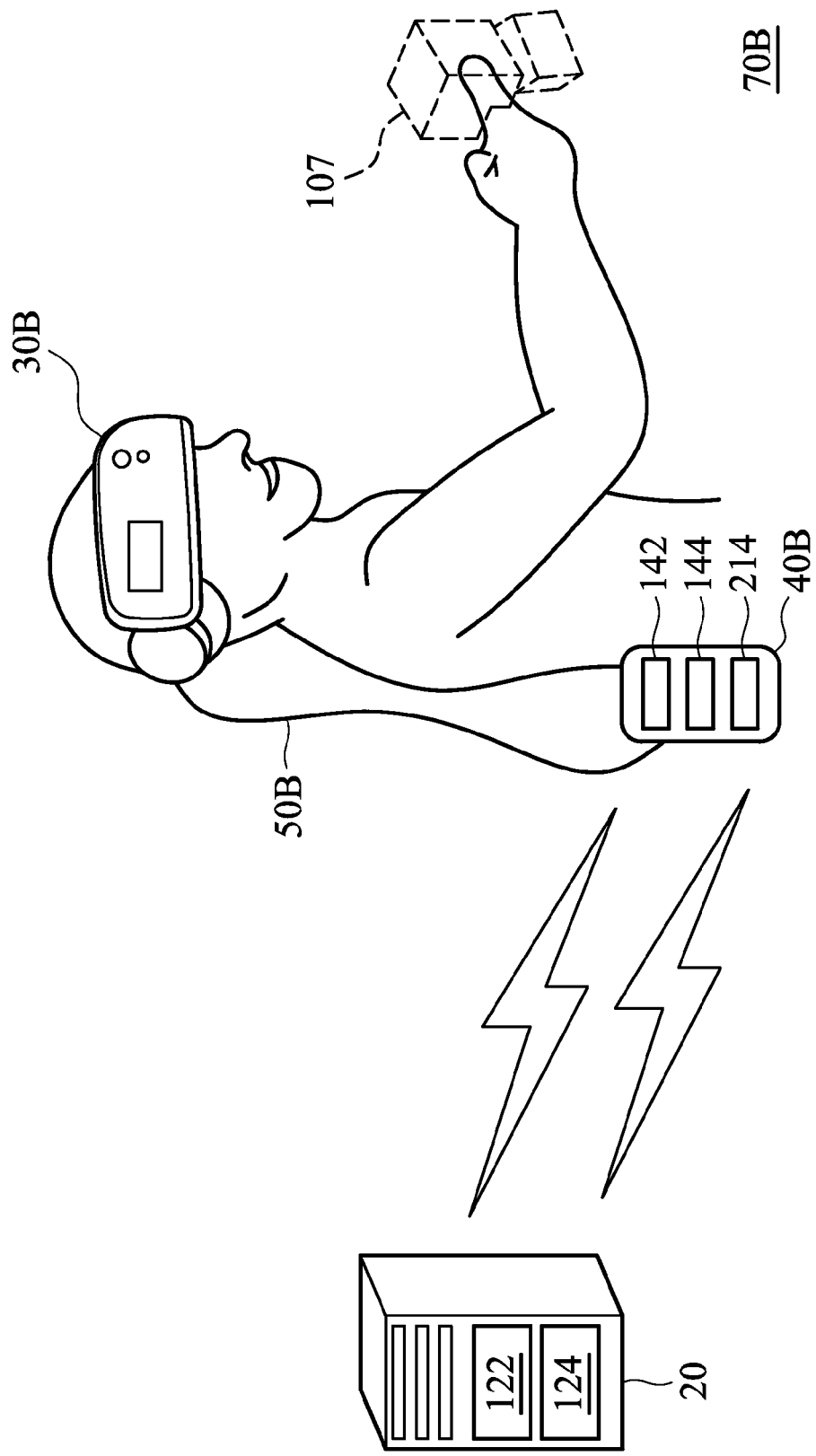
FIG. 7B shows an exemplary architecture of a virtual reality system according to another embodiment of the invention.

FIG. 7B shows an exemplary architecture of a virtual reality system 70B according to another embodiment of the invention. In FIG. 7B, the virtual reality system 70B comprises a host device 20, a head mounted display apparatus 30B, a connection control unit 40B, and a transmission cable 50B. In the embodiment, the connection control unit 40B is connected to the head mounted display apparatus 30B through the transmission cable 50B. The transmission cable 50B can transmit the multimedia content CXT, the communication data DAT, and the sensing information $INFO_S$ between the head mounted display apparatus 30B and the connection control unit 40B. In the embodiment, the connection control unit 40B comprises a wireless module 142 for receiving the multimedia content CXT from the host device 20, a wireless module 144 for receiving the communication data DAT from the host device 20 and providing the sensing information $INFO_S$ to the host device 20, a battery 214, and a controller (not shown) capable of controlling the operations of the wireless modules 142 and 144 and the battery 214. Furthermore, the controller of the connection control unit 40B can control the transmission cable 50B to transmit the power voltage PWR of the battery 214 to the head mounted display apparatus 30B. Compared with the transmission cable 50A of FIG. 7A, the transmission cable 50B further comprises a multimedia path for transmitting the multimedia content CXT. In the embodiment, the head mounted display apparatus 30B can obtain the multimedia content CXT from the host device 20 through the wireless module 142 of the connection control unit 40B and the transmission cable 50B. Furthermore, the head mounted display apparatus 30B can obtain the communication data DAT from the host device 20 through the wireless module 144 of the connection control unit 40B and the transmission cable 50B, and provides the sensing information $INFO_S$ to the host device 20 through the wireless module 144 of the connection control unit 40B and the transmission cable 50B. Compared with the head mounted display apparatus 30 of FIG. 2 and FIG. 6 and the head mounted display apparatus 30A of FIG. 7A, no wireless module is disposed in the head mounted display apparatus 30B, thereby decreasing power consumption of the head mounted display apparatus 30B. Since no wireless module is disposed in the head mounted display apparatus 30B, a thermal issue is less likely to occur in the head mounted display apparatus 30B. Furthermore, the battery 214 is disposed in the connection control unit 40B, thereby decreasing the weight of the head mounted display apparatus 30B. Thus, the user wearing the head mounted display apparatus 30B will feel more comfortable.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A virtual reality system, comprising:
a host device; and
a head mounted display apparatus, comprising:
a first wireless module;
a second wireless module;
a multimedia module, receiving multimedia content from the host device through the first wireless module;
a multi-sensing module, obtaining sensing information; and
a peripheral hub, receiving communication data from the host device through the second wireless module, and providing the sensing information to the host device through the second wireless module.

2. The virtual reality system as claimed in claim 1, wherein the host device comprises:
a third wireless module, providing the multimedia content to the first wireless module of the head mounted display apparatus;
a fourth wireless module, providing the communication data to the second wireless module of the head mounted display apparatus, and receiving the sensing information from the second wireless module of the head mounted display apparatus; and
a computing device, generating the multimedia content according to a multimedia source and the sensing information, and generating the communication data according to the sensing information.

3. The virtual reality system as claimed in claim 1, wherein the first and second wireless modules are circular and are mounted on a belt of or other wearable apparatus of the head mounted display apparatus.

4. The virtual reality system as claimed in claim 1, wherein the multimedia module comprises:
a display section, displaying a video part of the multimedia content;
an audio unit, delivering an audio part of the multimedia content or recording sound; and
a multimedia bridge coupled to the first wireless module, providing the multimedia content from the host device to the display section and the audio unit through the first wireless module, and providing the recorded sound from the audio unit to the host device through the first wireless module.

5. The virtual reality system as claimed in claim 1, wherein the multi-sensing module comprises:
a position sensing device, obtaining position information corresponding to the head mounted display apparatus;
a user sensing device, obtaining user information of the user; and
an environment sensing device, obtaining environment information,
wherein the multi-sensing module obtains the sensing information according to the position information, the user information, and the environment information.

6. The virtual reality system as claimed in claim 5, wherein the position information comprises movement information, orientation information, tilt angle information, and/or location information of the head mounted display apparatus; the user information comprises biometrical information about the user and/or an eye view information; and the environment information comprises images/video and/or depth information captured by the environment sensing device.

7. The virtual reality system as claimed in claim 1, wherein the head mounted display apparatus further comprises:
a battery; and
a power management device, providing a plurality of operation voltages to the multimedia module, the multi-sensing module, and the peripheral hub according to a power voltage from the battery.

8. The virtual reality system as claimed in claim 1, wherein the first and second wireless modules can be on board or a modular type near a main PCB.

9. A virtual reality system, comprising:
a host device;
a transmission cable;
a head mounted display apparatus, comprising:
a first wireless module;
a multimedia module, receiving multimedia content from the host device through the first wireless module; and
a multi-sensing module, obtaining sensing information;
a connection control unit coupled to the head mounted display apparatus through the transmission cable, comprising:
a second wireless module; and
a battery,
wherein the connection control unit receives the communication data from the host device through the second wireless module, and provides the communication data to the head mounted display apparatus through the transmission cable,
wherein the connection control unit receives the sensing information from the head mounted display apparatus through the transmission cable, and provides the sensing information to the host device through the second wireless module.

10. The virtual reality system as claimed in claim 9, wherein the host device comprises:
a third wireless module, providing the multimedia content to the first wireless module of the head mounted display apparatus;
a fourth wireless module, providing the communication data to the second wireless module of the connection control unit, and receiving the sensing information from the second wireless module of the connection control unit; and
a computing device, generating the multimedia content according to a multimedia source and the sensing information, and generating the communication data according to the sensing information.

11. The virtual reality system as claimed in claim 9, wherein the first wireless module is circular and is mounted on a belt of or other wearable apparatus of the head mounted display apparatus, and the second wireless module is circular and is mounted on a belt of or other wearable apparatus of the connection control unit.

12. The virtual reality system as claimed in claim 9, wherein the multimedia module comprises:
a display section, displaying a video part of the multimedia content;
an audio unit, delivering an audio part of the multimedia content or recording sound; and
a multimedia bridge coupled to the first wireless module, providing the multimedia content from the host device to the display section and the audio unit through the first wireless module, and providing the recorded sound from the audio unit to the host device through the first wireless module.

13. The virtual reality system as claimed in claim 9, wherein the multi-sensing module comprises:
a position sensing device, obtaining position information corresponding to the head mounted display apparatus;
a user sensing device, obtaining user information of the user; and
an environment sensing device, obtaining environment information,
wherein the multi-sensing module obtains the sensing information according to the position information, the user information, and the environment information.

14. The virtual reality system as claimed in claim 13, wherein the position information comprises movement information, orientation information, tilt angle information, and/or location information of the head mounted display apparatus; the user information comprises biometrical information about the user and/or an eye view information; and the environment information comprises images/video and/or depth information captured by the environment sensing device.

15. The virtual reality system as claimed in claim 9, wherein the head mounted display apparatus further comprises:
a power management device, providing a plurality of operation voltages to the multimedia module and the multi-sensing module according to a power voltage from the battery of the connection control unit through the transmission cable.

16. The virtual reality system as claimed in claim 9, wherein the first wireless module is on board or a modular type near a main PCB of the head mounted display apparatus, and the second wireless module is on board or a modular type near a main PCB of the connection control unit.

17. A virtual reality system, comprising:
a host device;
a transmission cable;
a head mounted display apparatus, comprising:
a multimedia module, obtaining multimedia content from the transmission cable; and
a multi-sensing module, obtaining sensing information;
a connection control unit coupled to the head mounted display apparatus through the transmission cable, comprising:
a first wireless module;
a second wireless module; and
a battery,
wherein the connection control unit receives the multimedia content from the host device through the first wireless module, and provides the multimedia content to the head mounted display apparatus through the transmission cable,
wherein the connection control unit receives the communication data from the host device through the second wireless module, and provides the communication data to the head mounted display apparatus through the transmission cable,
wherein the connection control unit receives the sensing information from the head mounted display apparatus through the transmission cable, and provides the sensing information to the host device through the second wireless module.

18. The virtual reality system as claimed in claim 17, wherein the host device comprises:

a third wireless module, providing the multimedia content to the first wireless module of the connection control unit;

a fourth wireless module, providing the communication data to the second wireless module of the connection control unit, and receiving the sensing information from the second wireless module of the connection control unit; and a computing device, generating the multimedia content according to a multimedia source and the sensing information, and generating the communication data according to the sensing information.

19. The virtual reality system as claimed in claim 17, wherein the first and second wireless modules can be circular and can be mounted on a belt or other wearable apparatus.

20. The virtual reality system as claimed in claim 17, wherein the multimedia module comprises:

a display section, displaying a video part of the multimedia content;

an audio unit, delivering an audio part of the multimedia content or recording sound; and a multimedia bridge coupled to the transmission cable, providing the multimedia content from the transmission cable to the display section and the audio unit, and providing the recorded sound from the audio unit to the connection control unit through the transmission cable.

21. The virtual reality system as claimed in claim 17, wherein the multi-sensing module comprises:

a position sensing device, obtaining position information corresponding to the head mounted display apparatus;

a user sensing device, obtaining user information of the user; and an environment sensing device, obtaining environment information, wherein the multi-sensing module obtains the sensing information according to the position information, the user information, and the environment information.

22. The virtual reality system as claimed in claim 21, wherein the position information comprises movement information, orientation information, tilt angle information, and/or location information of the head mounted display apparatus; the user information comprises biometrical information about the user and/or an eye view information; and the environment information comprises images/video and/or depth information captured by the environment sensing device.

23. The virtual reality system as claimed in claim 17, wherein the head mounted display apparatus further comprises:

a power management device, providing a plurality of operation voltages to the multimedia module and the multi-sensing module according to a power voltage from the battery of the connection control unit through the transmission cable.

24. The virtual reality system as claimed in claim 17, wherein the first and second wireless modules can by on board or a modular type near a main PCB.

* * * * *